Figure 1:
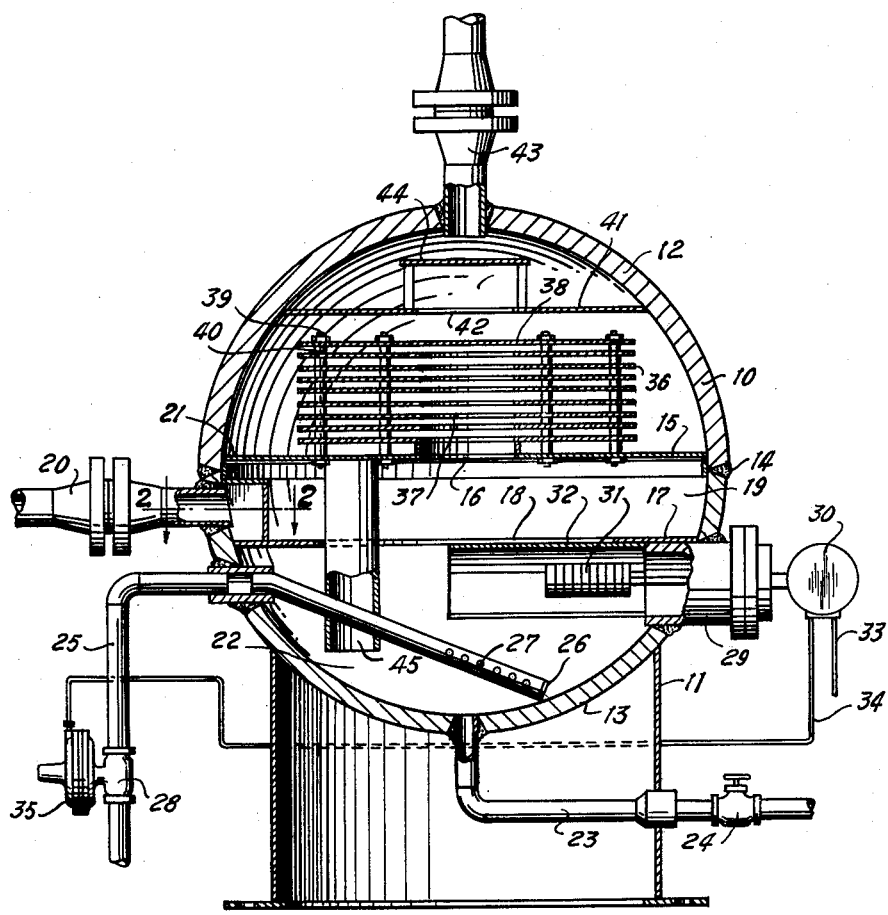

Nov. 14, 1961    C. O. GLASGOW    3,008,538
OIL AND GAS SEPARATOR
Filed Sept. 30, 1958    4 Sheets-Sheet 1

INVENTOR
Clarence O. Glasgow

BY

ATTORNEYS

INVENTOR
Clarence O. Glasgow
BY
ATTORNEYS

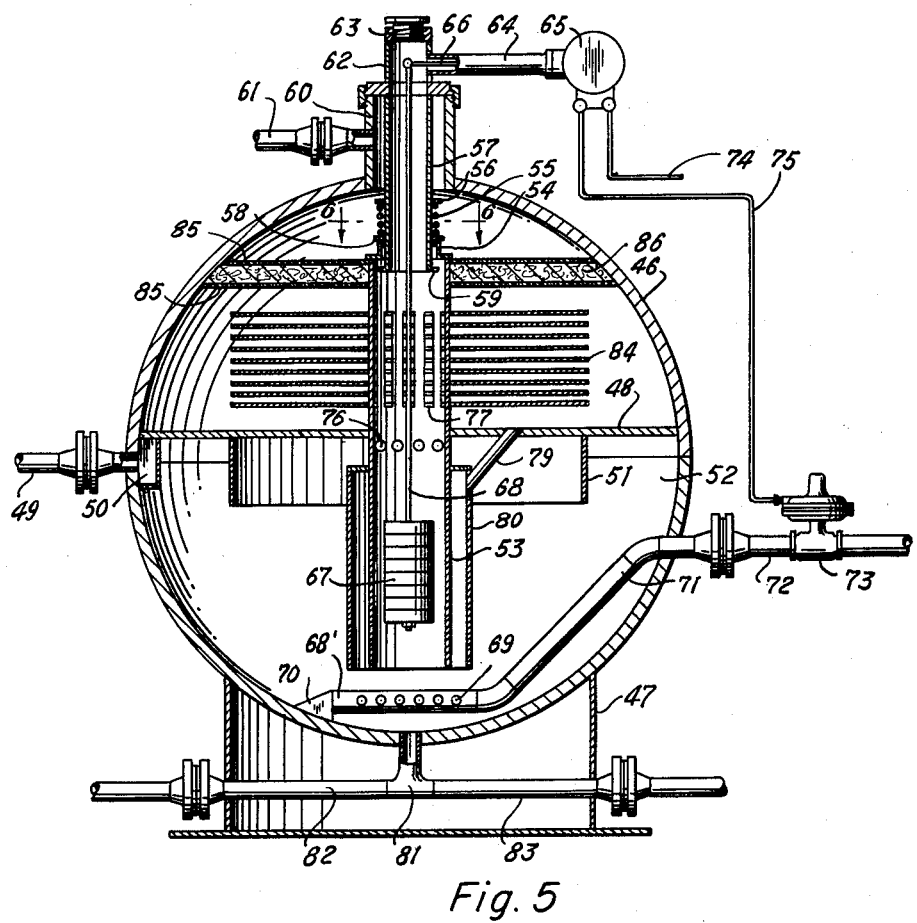
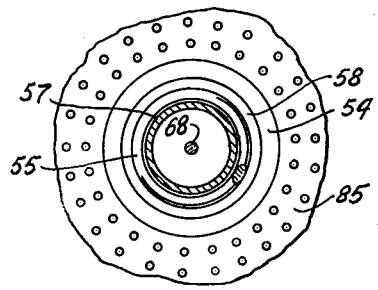
Fig. 5
Fig. 6

INVENTOR
Clarence O. Glasgow

BY *Ahley & Ahley*

ATTORNEYS

United States Patent Office
3,008,538
Patented Nov. 14, 1961

3,008,538
OIL AND GAS SEPARATOR
Clarence O. Glasgow, Tulsa, Okla., assignor to National Tank Company, Tulsa, Okla., a corporation of Nevada
Filed Sept. 30, 1958, Ser. No. 764,383
12 Claims. (Cl. 183—2.7)

This invention relates to new and useful improvements in oil and gas separators.

The invention is most directly concerned with oil and gas separators of the spherical type which may be constructed to operate at relatively high pressures while employing comparatively thin wall sections, and in which means is provided for a thorough extraction of mist and fine liquid particles from the effluent gas stream. Spherical oil and gas separators are necessarily rather compact in structure, and the problem arises of apportioning sufficient internal space within the separator to accommodate adequate means for thorough removal of liquid particles from the separated gas. The present invention accomplishes this desirable result, but at the same time, avoids the utilization of an excessively large portion of the interior or space of the separator for accommodation of the mist eliminator means.

It is, therefore, a principal object of this invention to provide an improved oil and gas separator of the spherical type in which adequate and effective mist elimination means are provided for removing fine or small liquid particles from the effluent gas stream while also providing within the limited interior of the separator effective and efficient oil and gas separation structures.

A further object of the invention is to provide an improved separator of the character described in which the effluent gas stream is caused to undergo repeated reversals of direction and to pass through shallow, ribbon-like flow spaces for coalescing of liquid particles and removal of such particles from the separated gas, and in which such flow spaces may be made divergent.

An additional object of the invention is to provide an improved separator of the character described in which there are provided pressure relief means for automatically opening in the event of a gas flow stoppage or impediment, providing for the by-passing by the effluent gas of portions of the mist extractor structure, but wherein, no gas is lost to the atmosphere.

A still further object of the invention is to provide an improved separator of the character described having unique mist eliminator structures in which the position and/or the configuration of closely spaced coalescing plates are utilized for more effective and complete mist elimination and liquid droplet coalescence.

Other and more specific objects will be apparent from a reading of the following description:

A construction designed to carry out the invention will be hereinafter described, together with other features of the invention.

Figure 2:
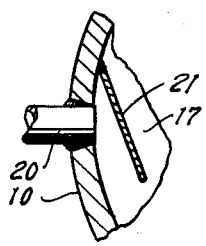
Figure 3:
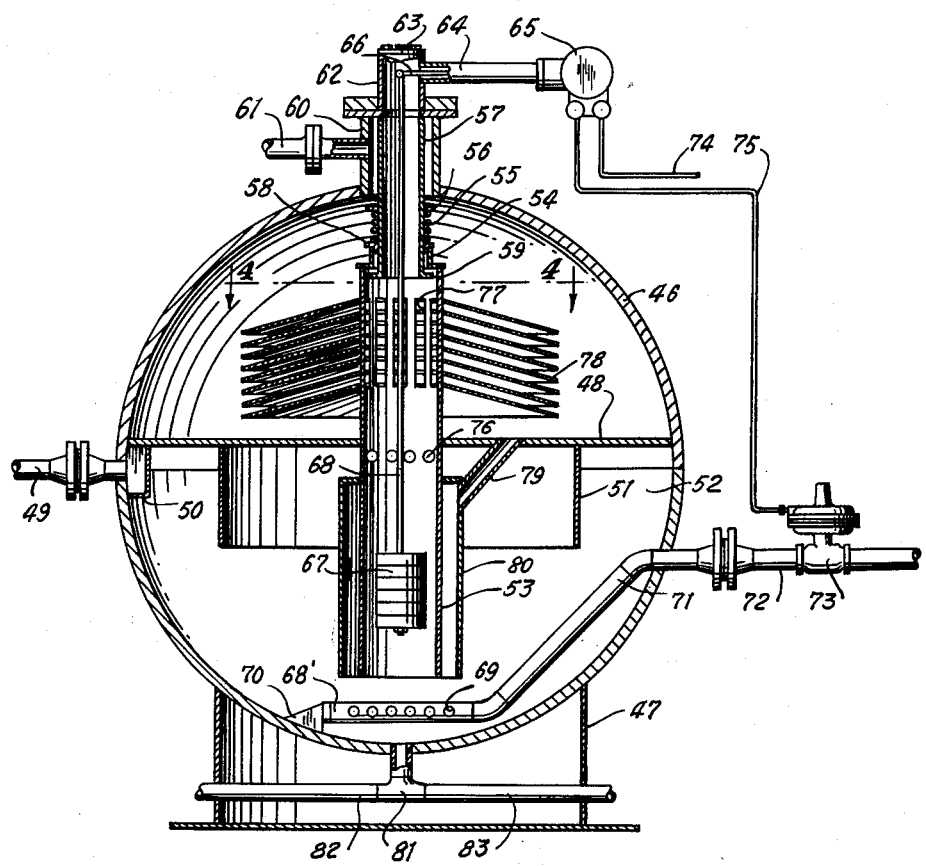
Figure 4:
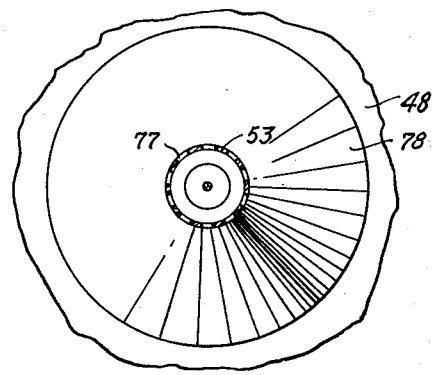
Figure 7:
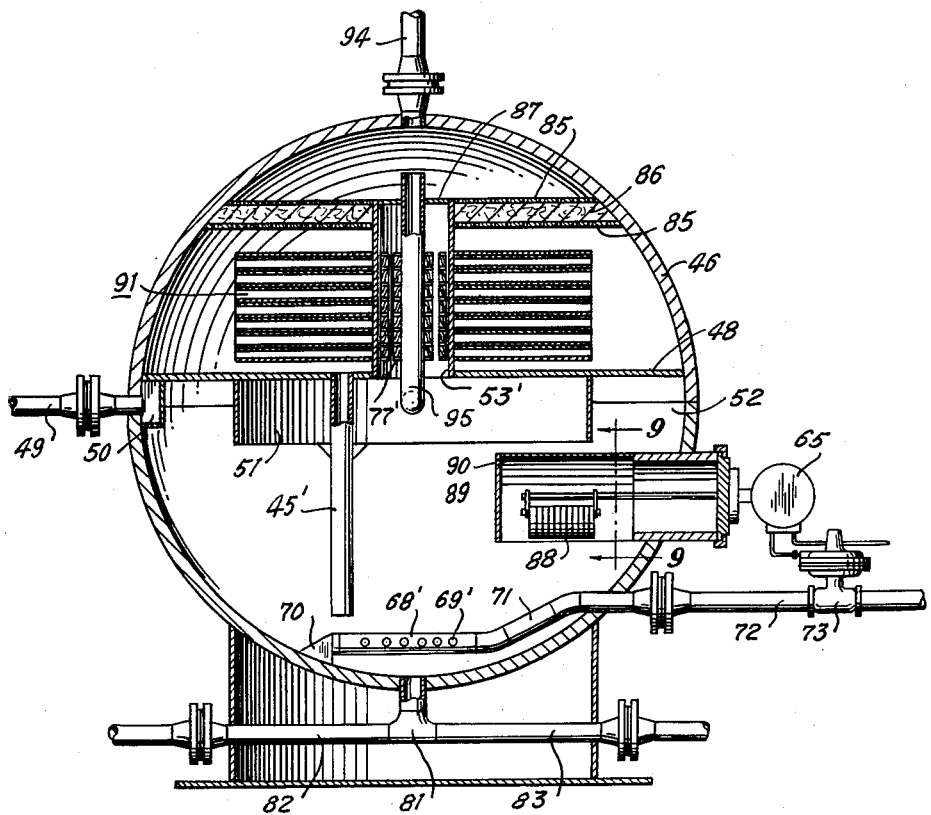
Figure 8:
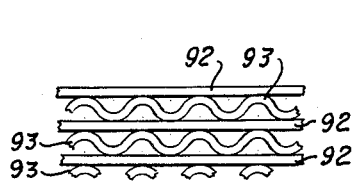
Figure 9:
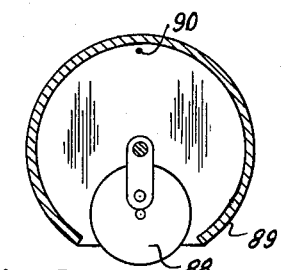

The invention will be more readily understood from a reading of the following specification and by reference to the accompanying drawings, wherein examples of the invention are shown, and wherein:

FIG. 1 is a vertical, sectional view of an oil and gas separator constructed in accordance with this invention, FIG. 2 is a fragmentary, horizontal, cross sectional view taken upon the line 2—2 of FIG. 1, FIG. 3 is a vertical, sectional view illustrating a modified form of the invention, FIG. 4 is a horizontal cross sectional view taken upon the line 4—4 of FIG. 3, FIG. 5 is a vertical, sectional view illustrating a further modification of the invention, FIG. 6 is a horizontal, cross sectional view taken upon the line 6—6 of FIG. 5, FIG. 7 is a vertical, sectional view showing an additional modification of the invention, FIG. 8 is an enlarged, fragmentary view in elevation of the edge portion of the mist eliminator baffles illustrating their configuration, and FIG. 9 is a vertical, cross sectional view taken upon the line 9—9 of FIG. 7.

In the drawings, the numeral 10 designates a spherical separator vessel or shell carried on a suitable base or support 11 and desirably formed of two hemispherical shells, 12 and 13, respectively, having their edges suitably joined, as by welding at 14. A transverse partition 15 extends horizontally across the medial portion of the vessel and is formed with a central gas outlet opening 16. Spaced below the partition 15, there is provided a circular baffle 17 having a large central opening 18 and having its outer periphery adjoining the inner walls of the vessel 10 to form with the partition 15 an annular flow path 19 through which well fluids may be directed for scrubbing and centrifugal separation of liquids therefrom.

A well stream inlet conductor 20 opens into the interior of the vessel 10 in alignment with the annular flow path 19 and directs the well stream into impingement upon a small baffle or diverter box 21 secured to the inner wall of the vessel 10 and overlying the inlet thereinto of the conductor 20. As shown in FIG. 2, the baffle or inlet box 21 is disposed angularly so as to cause the well stream to flow circumferentially or tangentially onto the inner surface of the vessel 10 in the space between the partition 15 and the baffle 17. Thus, the well stream is brought into intimate scrubbing relationship with the inner wall of the separator vessel as well as the opposing surfaces of the partitions 15 and 17, and directed to flow at relatively high velocity into the annular flow space 19 whereby both a scrubbing of liquid particles from the well stream is achieved as well as the benefits of centrifugal separation of liquid from gas. The separated liquids pass downwardly through the opening 18 into the lower portion of the separator vessel to accumulate in the quieting chamber constituted by the lower portion 22 of the separator vessel wherein continued evolution of gas may occur due to the appreciable volume of the chamber 22 and the prolonged time of residence provided for gas to evolve from the separated liquids by flowing upwardly and breaking through the surface thereof.

A clean-out or drain pipe 33 extends from the lowermost portion of the chamber 22 through a valve 24 which may be opened when complete draining of the separator vessel is desired. In normal operation, however, separated liquids are discharged from the vessel through an oil outlet conductor 25 extending through the side wall of the separator and downwardly at an angle toward the lower portion thereof. The inner end 26 of the outlet conductor is closed, and the portion of the conductor within the vessel is provided with a plurality of small spaced openings 27 through which separated liquids may enter the conductor for discharge through the motor valve 28. The provision of the plurality of small outlet openings 27 in the oil outlet pipe eliminates the tendency of a large single outlet opening to create a vortex within the separated liquids and cause the discharge with the liquids of sand and other foreign matter which may have entered the separator with the well stream and accumulated by settling in the lower portion of the separator vessel. Of course, it is desirable to remove the sand from the separated liquids in order to prevent damage to valves and other structures through which the liquids may pass as well as to produce as clean an oil product as possible. The utilization of the plurality of small discharge openings 27 has been found to achieve this desirable result in that the tendency to pick up sand and other settled foreign matter is eliminated. Of course, the accumulated sand and other material may be discharged from the separator structure by periodic opening of the valve 24.

For controlling the opening and closing of the valve 28 and the discharge of separated liquids from the interior of the separator vessel, a float fitting 29 is provided in the wall of the separator vessel, extending into the chamber 22 and carrying a conventional pilot valve structure 30 from which a liquid level responsive float 31 extends into the interior of the chamber 22. An open ended semicylindrical shield 32 overlies the float 31 and prevents the downwardly flowing liquids from impinging thereon and insure the maintenance of the float in a relatively quiet area of the liquid surface. The float 31, of course, responds to rising and falling liquid levels within the chamber 22 to open or close the pilot valve 30 and control the supplying of pilot gas under pressure from the supply conductor 33 to the actuating gas conductor 34 which, in turn, is connected to the diaphragm housing or other motor means 35 of the valve 28. In this manner, as the float 31 moves upwardly, the pilot valve 30 opens to supply gas to the motor valve 28, opening the valve 28 and permitting the discharge of separated liquids. Similarly, lowering of the float 31 will result in closing of the valve 28 to terminate the discharge of liquids. This is all quite conventional liquid level control apparatus, and in most instances, the apparatus is constructed or adjusted to maintain as far as possible a relatively constant liquid level within the lower portion of the separator.

In the upper portion of the separator vessel, a plurality of parallel, closely spaced, superimposed coalescing plates 36 are mounted upon the partition 15 and provided with central openings 37 aligning with the opening 16. The uppermost plate 38 is imperforate, and thus, gas passing upwardly through the opening 16 may also pass through the openings 37, but will be caused by the imperforate uppermost plate 38 to pass laterally outwardly between the closely spaced plates 36. Any suitable or desirable means may be provided for positioning the plates 36, it having been found convenient to employ a plurality of tie bolts 39 which extend through the partition 15 and the plates 36 and 38, and which carry short spacer sleeves 40 between adjacent ones of the coalescing plates for properly positioning the plates with respect to one another.

In flowing between the closely spaced plates 36, the separated gas is directed into a plurality of thin disk-like flow passages in which the gas is brought repeatedly into scrubbing contact with the surfaces of the coalescing plates in order that mist and small liquid droplets present in the gas may come into contact with the plates and wet or adhere to the surfaces of the plates. Further, since the flow space between the coalescing plates increases as the gas flows radially outwardly therebetween, the velocity of the gas will necessarily decrease continuously, thus affording increasing opportunity for liquid droplets to settle from the plurality of thin bodies of flowing gas and come into contact with the plates 36 in order to wet the plates and be collected thereon. In addition, it is to be pointed out that as the gas passes from the annular flow space 19 upwardly through the openings 16 and 37 and into the spaces between the plates 36, there is a complete reversal of flow providing centrifugal separation of liquid droplets in addition to coalescent separation.

Above the plates 36 and in the uppermost part of the separator vessel, a second partition 41 extends horizontally across the separator, the partition 41 being formed with a central outlet opening 42 so that the gas exiting from between the plates 36 is again required to undergo a complete reversal in direction in order to reach the opening 42 and pass upwardly therethrough to the gas outlet conductor 43 extending from the upper end of the vessel 10. Further, a central plate 44 is positioned in spaced relationship above the opening 42, again causing the gas to undergo reversal in direction and be scrubbed upon the walls of the separator vessel before being discharged through the conductor 43. For returning collected liquids from above the partition 15 into the chamber 22, a relatively large drain pipe 45 is provided, the pipe extending from the partition 15 into the lower portion of the chamber 22 below the liquid level therein so that a liquid seal is provided for the lower end of the pipe 45 and the gas may not pass upwardly therethrough from the lower section of the separator.

The mist elimination or coalescing structure which has been shown and described is very compact in proportion to the area of coalescing surfaces provided as well as the several reversals in direction of gas flow which the gas stream is required to undertake, and accordingly, only the upper portion of the vessel 10 is required for accommodation of this scrubbing structure. The central and lower portion of the vessel is thus made available for oil and gas separation, i.e., the removal of the major portions of liquid from the well stream, and for the retention of separated liquids for prolonged periods of time to permit settling of sand and other foreign matter therefrom as well as the evolution of gas. The net result is a very small and compact oil and gas separator functioning very efficiently for removal of liquids from the well stream, but also functioning very efficiently for removal of mist and small liquid particles from the separated gas.

In FIG. 3 of the drawings there is illustrated a modified form of the invention in which the spherical separator vessel 46 is carried upon a suitable base or support 47 and provided with a transverse, horizontal partition 48 extending across its central portion. A well stream inlet conductor 49 opens into the interior of the vessel immediately below the partition 48, communicating with the vessel through a diverter box 50, similar to the box 21, which directs the incoming well stream in a tangential or circumferential flow path about the inner wall of the vessel 46 below the partition 48. An annular skirt 51 depends from the partition 48, the skirt being spaced from the side wall of the separator vessel to define an annular flow path 52 through which the well stream is directed.

For conducting separated gas into the upper part of the separator as well as for forming a turbulence-free flow chamber, a flume 53 extends vertically and axially of the separator vessel from a point near the bottom thereof, upwardly through the partition 48 to a point near the upper wall of the vessel, and has its upper end engaged by a flanged collar 54. The collar 54 is constantly urged downwardly into engagement with the upper end of the flume 53 by a coiled spring 55 confined between an outwardly-extending flange 56 formed upon an upwardly-extending sleeve 57 and a flanged ring 58 slidably mounted upon the sleeve 57 and bearing downwardly upon the collar 54. The sleeve 57 has its lower end flanged at 59 and extending into the upper end of the flume 53 beneath the collar 54 while its upper portion extends axially upwardly through a flanged gas outlet fitting 60. The gas outlet conductor 61 extends laterally from the fitting 60, and a flanged collar 62, having a closed upper end 63, is suitably connected to the upper end of the fitting 60 as by bolting or other suitable means. A tubular member 64 extends laterally of the collar 62 and carries a pilot valve 65 from which an actuating arm 66 extends through the tubular member 64 into the collar 62. A liquid level responsive float member 67 is suspended in the lower portion of the flume 53, well below the partition 48, by a vertical rod 68 extending upwardly through the flume 53 and connected to the inner end of the actuating arm 66. Thus, the float 67 disposed in the separator vessel is enabled to swing the rod 66 in a vertical arc for actuating the pilot valve 65.

For withdrawing separated liquids from the vessel 46, a discharge conductor 68 extends across the lower end of the vessel below the lower end of the flume 53, the conductor being provided with a plurality of relatively small drain perforations 69 and having its inner end supported upon a bracket 70 secured to the bottom wall of the separator vessel. The horizontal conductor 68 is connected to an upwardly inclined conductor 71 which, in turn, is connected to an outlet conductor 72 extending through the side wall of the separator vessel and through a suitable motor valve 73. As described in the first form of the invention, a pilot gas supply conductor 74 leads to the pilot valve 65, the latter being operative to admit actuating pilot gas to a pilot gas conductor 75 leading to the motor valve 73 for opening the motor valve, or for exhausting actuating gas from the conductor 75 to close the valve 73. Since the rising and falling of the float 67 actuates the pilot valve 65, the latter is enabled, in turn, to actuate the valve 73 to maintain the desired liquid level in the lower portion of the separator vessel.

It will be noted that the flume 53 extends below the normal liquid level in the separator vessel and thus has its lower end covered by a liquid seal to prevent the flow of gas upwardly therethrough. For accommodating the separated gas, the flume is provided with a plurality of radial openings or ports 76 extending through the wall of the flume immediately below the partition 48, and a plurality of longitudinal openings or slots 77 opening radially through the wall of the flume 53 at an elevation spaced between the partition 48 and the upper end of the flume 53. The slots open into the shallow disk-like flow passages formed between a plurality of superposed, conical, downwardly extending baffle plates 78 secured to the outer wall of the flume 53 and having their inner peripheries overlying the slots 77. The plates 78 are in the form of relatively flat cones which extend radially outwardly from the flume 53 toward the inner wall of the separator vessel 46.

For accommodating separated liquids draining onto the upper partition 48, a short drain conductor 79 extends angularly and downwardly from the partition 48 into the upper end of a cylindrical enclosure 80 surrounding the lower portion of the flume 53 and having a closed upper end to prevent the escape of gas. The bottom end of the enclosure 80 is open and may be made coextensive with the lower end of the flume 53, but in any event, desirably extends below the normal liquid level within the lower portion of the separator vessel to provide a liquid seal and prevent the flow of gas upwardly through the enclosure and the conductor 79. A second drain conductor 81 opens into the lowermost portion of the vessel 46 and is provided with two branches 82 and 83 for draining sand and other foreign matter from the vessel. Through utilization of the two branches of the drain conductor, steam, or other fluid under pressure, may be admitted to one branch conductor in order to aid in the ejection of sand and the like through the other branch discharge conductor.

In the operation of this form of the invention, the well stream is admitted to the separator vessel through the inlet conductor 49 and diverter box 50, in order to cause the well stream to enter the interior of the vessel tangentially and to flow circumferentially through the flow space 52 whereby the well stream is subjected to vigorous scrubbing action and also receives the benefits of centrifugal separation. The skirt 51 prevents liquids from being splashed into the openings 76, the separated gas being required to flow downwardly and beneath the lower edge of the skirt 51 before flowing upwardly to enter into the openings 76. As was the case in the first described form of the invention, the separated liquids are accumulated in the lower portion of the separator vessel at an elevation above the lower ends of the flume 53 and the enclosure 80 whereby a large accumulation and retention chamber is provided, as well as a surge chamber to accommodate momentary excessive flows of well fluid, and thus, ample opportunity is provided for the settling of foreign matter from the separated liquids as well as the evolution of gas therefrom.

The gas passes upwardly from the openings 76 through the flume 53 to the slots 77 and then outwardly through the shallow and closely spaced flow passages between the plates 78 for further scrubbing and coalescing of liquid particles. Upon exiting from the spaces between the plates 78, the gas is required to undergo a complete reversal in direction of flow while being scrubbed upon the walls of the vessel 46 before flowing upwardly into the interior of the fitting 60 for discharge through the outlet conductor 61. Again, the velocity of the flow of the gas constantly decreases as it flows outwardly between the plates 78, increasing the tendency of the liquid particles to settle onto the plates, while the downward inclination of the plates 78 facilitates the draining of coalesced liquids from the plates onto the partition 48. These liquids, of course, flow downwardly through the pipe 79 into the enclosure 80 for removal through the outlet conductor 68. Also as was true of the first form of the invention, the provision of a plurality of discharge openings 69 minimizes the tendency for the outwardly flowing liquid to create a vortex which would pick up sand and other foreign matter.

It is to be noted that the collar 54 is adapted to be forced upwardly by compressing the spring 55 so as to permit the discharge of gas from the open upper end of the flume 53. There may be instances in which either the slots 77 or the spaces between the coalescing plates 78 may become partially or fully clogged due to the accumulation of various materials thereon, and in such event, the collar 54 would function as a pressure relief valve to move upwardly and permit the flow of gas from the upper end of the flume 53 into the interior of the fitting 60. Obviously, this gas would not be discharged to atmosphere or lost, but until the malfunctioning of the plates 78 is corrected, such by-passed gas will not flow between the plates. The structure is effective to avoid the building up of excessive gas pressures within the flume 53.

A still further modification of the invention is shown in FIG. 5, this modification being very similar to that shown in FIG. 3 and the same numerals being employed to designate similar or identical elements.

The principal differences between the modifications of FIG. 5 and FIG. 3 are to be found in the coalescing plates 84 which overlie the slots 77 similarly to the plates 78 and extend radially outwardly therefrom in closely spaced horizontal parallel relationship, but the plates 84 are disposed horizontally rather than downwardly inclined as were the plates 78. In addition, there is provided in the upper portion of the separator vessel above the plates 84 a pair of spaced, parallel, horizontally extending, perforated or foraminous partitions 85 having their inner peripheries adjoining the upper end of the flume 53 and their outer margins welded or otherwise suitably joined to the inner wall of the vessel 46. Between the plates 85, there is confined a body of filtering or coalescing material 86 formed of closely entwined and entangled, elongate metallic filaments forming a body similar to rather coarse steel wool. Such coalescing material is available commercially under the trademark "Metex" and is formed of a very large number of elongate metallic strands so intertwined and compacted as to provide a multiplicity of devious flow passages through which gas must flow before being discharged through the outlet conductor 61. The multiplicity of metal strands and convoluted flow passages provide almost innumerable flow paths for the gas in which the gas repeatedly impinges upon the metallic filaments so that the liquid particles therein wet the metallic strands and are thus coalesced and removed from the gas stream.

The operation of this third form of the invention is substantially the same as that of the second described form, illustrated in FIG. 3, there being added the secondary mist eliminator or mist coalescer provided by the foraminous pad 86 which further insures the removal of all possible liquid particles from the withdrawn gas.

In the form of the invention illustrated in FIG. 7, many of the elements of construction again are quite similar to those shown in preceding forms of the invention, and therefore, like numbers have been employed to designate like parts.

In this last described form of the invention, the spherical separator shell 46 carries the internal transverse partition 48, and the well stream inlet conductor 49 opens into the vessel through the diverter box 50 positioned closely adjacent the underside of the partition 48. The skirt 51 depending from the partition 48 encloses the annular flow path 52, while a gas flume 53' extends upwardly from the center of the partition 48 toward the upper end of the separator vessel. The secondary mist eliminator plates 85 and mist eliminator pad 86 extend horizontally between the upper end of the flume 53' and the side walls of the vessel, but the upper end of the flume 53' is closed by a plate 87. A drain conductor 45' extends downwardly from the partition 48 into the lower portion of the vessel, and a drain assembly 68', 69, 70, 71, 72 and 73, substantially identical to that shown in FIGS. 3 and 5, extends from the lower portion of the separator vessel to the exterior thereof.

The liquid level controlling float 88 is disposed in the lower portion of the vessel within a closed-end, semi-cylindrical housing 89, similar to the housing 32 and actuates the pilot valve 65 for, in turn, actuating the motor valve 73. The housing 89 is provided with a small vent 90 in its upper portion to prevent the entrapment of gas therein.

In the upper portion of this form of the oil and gas separator, the flume 53' is provided with the longitudinal slotted openings 77' from which a coalescing plate assembly 91 projects radially outwardly into the upper portion of the separator vessel. As shown in FIG. 8, the coalescing plate assembly includes a plurality of spaced parallel disk-like plates 92 extending radially and horizontally from the outer wall of the flume 53 above the partition 48 and being in alignment with the slots 77', there being sandwiched between each pair of the plates 92, a corrugated plate 93 having radial divergent corrugations extending from its inner periphery to its outer periphery. These corrugated plates not only serve to space the plates 92 from one another, but also provide amplified scrubbing and coalescing surfaces as well as positively defined drainage channels for the separated liquids.

This form of the invention is provided with two alternate gas outlets, one being a conventional gas outlet pipe 94 projecting upwardly from the upper end of the vessel 46, and the other being a secondary or alternate gas outlet conductor 95 extending from the space in the vessel above the pad 86 downwardly through the plate 87 and axially of the flume 53' to a point below the partition 48, at which point the conductor 95 turns laterally and extends through the side wall of the vessel 46. Obviously, either outlet may be employed as may be desired by the operator, the outlet 95 having the advantage of being nearer ground level and more easily accessible for connection of the gas discharge pipe line thereto. The auxiliary drain conductor assembly 81, 82 and 83 is also provided.

In the operation of this last described form of the invention, the well stream enters through the conductor 49 as previously described and is diverted by the inlet box 50 into tangential and circumferential flow through the flow path 52 from which liquid is participated downwardly for accumulation in the lower portion of the separator while gas passes upwardly through the flume 53 into the shallow and divergent flow paths defined by the plates 92 and 93. The gas thus undergoes a complete change of directions for centrifugal liquid separation prior to enter into the plates 92 and 93, is thoroughly scrubbed and liquid particles coalesced therefrom in the shallow divergent flow paths between the coalescing plates before again undergoing a complete reversal in direction of flow and scrubbing upon the walls of the vessel 46 before passing upwardly through the secondary coalescing pad 86. Thus, the structure again provides adequate and efficient liquid and gas separation means with liquid accumulation space combined with a surge chamber for prolonged retention of separated liquids, the gas being passed repeatedly through changes in direction of flow, through the closely spaced coalescing plates and further scrubbing steps before final mist extraction in the pad 86.

In all the forms of the invention, quite adequate liquid and gas separation space is provided, thoroughly effective and efficient mist elimination means are supplied, along with a rather large liquid quieting and gas elimination chamber, the whole being carried out in a relatively small vessel of extremely compact structure. In each form of the invention, means is provided for preventing the forming of a vortex by the liquids being discharged so that sand and other foreign material are not picked up and withdrawn with the discharged liquids, and the unique, radially divergent, closely spaced coalescing plates are employed to permit a settling of small droplets from the outwardly flowing gas stream so that such droplets are caused to wet the coalescing plates and be collected thereon rather than being carried from the separator in the outlet gas in the form of a mist of finely divided liquid particles.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. An oil and gas separator for petroleum well streams including, a separator vessel, a partition extending transversely of the vessel and dividing the vessel into an upper compartment and a lower compartment, a well stream inlet conductor opening into the lower compartment below the partition, a liquid discharge conductor for discharging separated oil from the lower compartment of the vessel, means forming a flow passage extending upwardly from the center of the partition for conducting separated gas into the upper compartment of the vessel, a plurality of closely spaced plates extending from the flow passage into the upper compartment of the vessel and forming a plurality of shallow radially divergent parallel-flow paths for the separated gas, and a gas outlet from the upper compartment of the vessel.

2. An oil and gas separator as set forth in claim 1, wherein the partition is positioned medially of the vessel whereby the upper and lower compartments of the vessel are approximately equal in volume.

3. An oil and gas separator for petroleum well streams including, a separator vessel, a partition extending transversely of the vessel and dividing the vessel into an upper compartment and a lower compartment, a well stream inlet conductor opening into the lower compartment below the partition, a liquid discharge conductor for discharging separated oil from the lower compartment of the vessel, means forming a flow passage extending upwardly from the center of the partition for conducting separated gas into the upper compartment of the vessel, a plurality of closely spaced plates extending radially and outwardly from the flow passage into the upper compartment of the vessel and forming a plurality of shallow radially divergent parallel-flow paths for the separated gas, and a gas outlet from the upper compartment of the vessel.

4. An oil and gas separator as set forth in claim 1, and a liquid drain conductor extending downwardly from the partition into the lower compartment of the vessel.

5. An oil and gas separator for petroleum well streams including, a separator vessel, a partition extending transversely of the vessel and dividing the vessel into an upper compartment and a lower compartment, a well stream inlet conductor opening into the lower compartment below the partition, a liquid discharge conductor for discharging separated oil from the lower compartment of the vessel, means forming a closed-upper end flow passage extending upwardly from the center of the partition for conducting separated gas into the upper compartment of the vessel, a plurality of closely spaced plates extending from the flow passage into the upper compartment of the vessel and forming a plurality of shallow radially divergent parallel-flow paths for the separated gas, pressure relief means in the flow passage for bypassing separated gas around the flow paths, and a gas outlet from the upper compartment of the vessel.

6. An oil and gas separator as set forth in claim 1, wherein the plates extend downwardly and outwardly from the flow passage.

7. An oil and gas separator as set forth in claim 1, wherein the plates include smooth-surfaced plates alternated with spacer plates of uneven configuration.

8. An oil and gas separator as set forth in claim 1, wherein the plates include smooth-surfaced plates alternated with spacer plates having divergent corrugations.

9. An oil and gas separator as set forth in claim 1, and a liquid deflector depending from the partition, the deflector being perimetric with respect to the entrance to the flow passage and forming with the inner wall of the vessel a perimetric flow path for the well stream.

10. An oil and gas separator as set forth in claim 1, wherein the plates extend horizontally in the vessel.

11. An oil and gas separator as set forth in claim 1, wherein the means forming the flow passage is a tubular member extending from near the bottom of the lower compartment into the upper compartment thereof, the tubular member having gas admission ports in the lower compartment of the vessel and gas discharge openings in registry with the flow paths between the plates.

12. An oil and gas separator as set forth in claim 1, wherein the means forming the flow passage is a tubular member extending from near the bottom of the lower compartment into the upper compartment thereof, the tubular member having gas admission ports in the lower compartment of the vessel closely adjacent the underside of the partition and gas discharge openings in registry with the flow paths between the plates, the well stream inlet conductor opening into the lower compartment closely beneath the partition.

References Cited in the file of this patent

UNITED STATES PATENTS

| | | |
|---|---|---|
| 1,506,967 | Bosworth | Sept. 2, 1924 |
| 1,553,973 | Ballou | Sept. 15, 1925 |
| 1,786,790 | Sutton | Dec. 30, 1930 |
| 1,920,437 | Sillers | Aug. 1, 1933 |
| 2,016,641 | Lincoln | Oct. 8, 1935 |
| 2,349,944 | Dixon | May 30, 1944 |
| 2,685,938 | Walker et al. | Aug. 10, 1954 |
| 2,777,533 | Segrest | Jan. 15, 1957 |
| 2,809,712 | Muller | Oct. 15, 1957 |
| 2,868,312 | Erwin | Jan. 13, 1959 |
| 2,893,510 | Spann | July 7, 1959 |
| 2,910,136 | Valliant et al. | Oct. 27, 1959 |